US012675837B2

(12) United States Patent
    Zhang

(10) Patent No.:  US 12,675,837 B2
(45) Date of Patent:       Jul. 7, 2026

(54) IMAGE EDITING METHOD AND DEVICE

(71) Applicant: Beijing Zitiao Network Technology Co., Ltd., Beijing (CN)

(72) Inventor: Xinghua Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 395 days.

(21) Appl. No.: 18/263,516

(22) PCT Filed: Jan. 17, 2022

(86) PCT No.: PCT/CN2022/072316
§ 371 (c)(1),
(2) Date: Jul. 28, 2023

(87) PCT Pub. No.: WO2022/161199
PCT Pub. Date: Aug. 4, 2022

(65) Prior Publication Data
US 2024/0104811 A1       Mar. 28, 2024

(30) Foreign Application Priority Data
Jan. 29, 2021     (CN) .......................... 202110129764.0

(51) Int. Cl.
G06T 11/60          (2026.01)
G06T 1/60           (2006.01)

(52) U.S. Cl.
CPC ............... G06T 11/60 (2013.01); G06T 1/60 (2013.01)

(58) Field of Classification Search
USPC ....................................................... 345/619
See application file for complete search history.

(56) References Cited

U.S. PATENT DOCUMENTS 5,162,923 A  *  11/1992  Yoshida ................... H04N 1/41
                                                      382/250
11,297,332 B1 *  4/2022  Walters ................ G06N 3/0464
(Continued)

FOREIGN PATENT DOCUMENTS

CN         101399033 A      4/2009
CN         102368779 A      3/2012
(Continued)

OTHER PUBLICATIONS

China National Intellectual Property Administration, Office Action Issued in Application No. 202110129764.0, Jun. 5, 2024, 10 pages.
(Continued)

*Primary Examiner* — James A Thompson
*Assistant Examiner* — Kim Thanh T Tran
(74) *Attorney, Agent, or Firm* — Alleman Hall LLP

(57)                ABSTRACT

Embodiments of the present disclosure provide an image editing method and device, when detecting that a user processes a to-be-processed image with a relatively high resolution, an electronic device generates and displays a preview image of the to-be-processed image. In the process of editing the preview image by the user, the electronic device stores editing instructions in turn. When the user saves the edited preview image, the electronic device loads the block corresponding to the editing instruction into a memory according to the stored editing instruction, edits the block according to the editing instruction, and generates a target image according to the edited block.

17 Claims, 6 Drawing Sheets

(56) References Cited

U.S. PATENT DOCUMENTS

| | | | | |
|---|---|---|---|---|
| 2006/0044317 | A1* | 3/2006 | Bourd | G06T 1/60 |
| | | | | 345/557 |
| 2010/0053689 | A1 | 3/2010 | Ohwaku et al. | |
| 2016/0219308 | A1* | 7/2016 | Zheng | H04N 19/122 |
| 2016/0309111 | A1 | 10/2016 | Chen et al. | |
| 2017/0019604 | A1* | 1/2017 | Kim | H04N 1/2112 |
| 2017/0109023 | A1* | 4/2017 | Cherna | G06F 3/0488 |
| 2022/0335671 | A1* | 10/2022 | Erickson | G06T 11/40 |

FOREIGN PATENT DOCUMENTS

| | | | |
|---|---|---|---|
| CN | 102663664 | A | 9/2012 |
| CN | 103123718 | A | 5/2013 |
| CN | 103995684 | A | 8/2014 |
| CN | 105224647 | A | 1/2016 |
| CN | 105427235 | A | 3/2016 |
| CN | 105791664 | A | 7/2016 |
| CN | 109859211 | A | 6/2019 |
| CN | 110022417 | A | 7/2019 |
| CN | 110187924 | A | 8/2019 |
| CN | 111340914 | A | 6/2020 |
| JP | 2010136185 | A | 6/2010 |
| JP | 2011061730 | A | 3/2011 |
| WO | 2015179459 | A1 | 11/2015 |

OTHER PUBLICATIONS

China National Intellectual Property Administration, Notice of Allowance Issued in Application No. 202110129764.0, Aug. 13, 2024, 8 pages.

Zhang, Q., "Tone-aware Image and Video Understanding and Editing," Computer Appliation Technology Thesis, Wuhan University School of Computers, May 1, 2017, 116 pages. Submitted with English cover page and abstract. Submitted in two parts.

Holesova, A. et al., "Development of Application for Simulation of Video Quality Degradation Artifacts," Proceedings of the 17th International Conference on Emerging eLearning Technologies and Applications (ICETA 2019), Nov. 21, 2019, The High Tatras, Slovak Republic, 9 pages.

China National Intellectual Property Administration, International Search Report and Written Opinion Issued in Application No. PCT/CN2022/072316, Mar. 28, 2022, WIPO, 11 pages.

Xingzhong128, "BitmapRegionDecoder Load Big Picture Implementation," Available Online at https://developer.android.com/reference/android/graphics/BitmapRegionDecoder, May 8, 2018, 5 pages, submitted with English abstract.

* cited by examiner

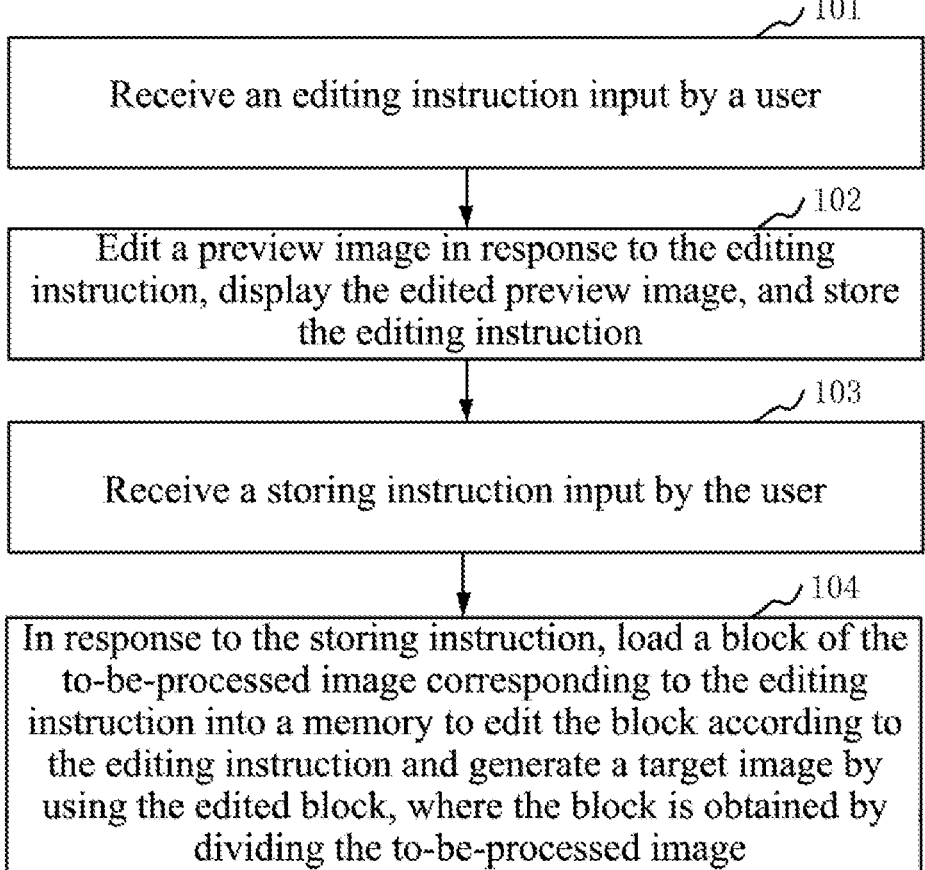

101

Receive an editing instruction input by a user

102

Edit a preview image in response to the editing instruction, display the edited preview image, and store the editing instruction

103

Receive a storing instruction input by the user

104

In response to the storing instruction, load a block of the to-be-processed image corresponding to the editing instruction into a memory to edit the block according to the editing instruction and generate a target image by using the edited block, where the block is obtained by dividing the to-be-processed image

FIG. 2

Sub-block

Preview image

Original image

IMAGE EDITING METHOD AND DEVICE

CROSS-REFERENCE TO RELATED APPLICATIONS

This application is a National Stage of International Application No. PCT/CN2022/072316, filed on Jan. 17, 2022, which claims priority to Chinese Patent Application No. 202110129764.0, filed on Jan. 29, 2021, both of which are hereby incorporated by reference in their entireties.

TECHNICAL FIELD

Embodiments of the present disclosure relate to the field of image processing technologies and, in particular, to an image editing method and device.

BACKGROUND

With the rapid development of technologies, more and more users edit images by using electronic devices, so as to get an ideal display effect of the images. Image editing includes brightness adjustment, contrast adjustment, sticker addition, etc.

In the common image editing process, an electronic device loads an image selected by a user into a memory, and displays an editing tool, such as filtering, cropping, adjustment, or the like, while displaying the image on an interface. The user edits the image with the editing tool. After the editing is finished, the electronic device saves the edited image.

However, when the to-be-edited image is relatively large, such as a 4K resolution or an 8K resolution image, due to the limited performance of the memory and the central processing unit (CPU) of the electronic device, full loading of the image will bring a very large overhead to the memory and the CPU, and even the phenomenon of system collapse will occur due to insufficient memory. Therefore, how to edit an image with relatively high resolution, that is, how to edit a large image or an ultra-large image is considered to be a problem to be solved in the industry.

SUMMARY

Embodiments of the present disclosure provide an image editing method and device, so as to overcome the problem of system collapse caused by insufficient memory or CPU when editing an image with relatively high resolution.

In a first aspect, an embodiment of the present disclosure provides an image editing method, including:

receiving an editing instruction input by a user, where the editing instruction is used for editing a preview image, the preview image is generated by processing a to-be-processed image according to screen resolution of an electronic device, and resolution of the preview image is lower than that of the to-be-processed image; editing the preview image in response to the editing instruction, displaying the edited preview image, and storing the editing instruction; receiving a storing instruction input by the user; in response to the storing instruction, loading a block of the to-be-processed image corresponding to the editing instruction into a memory to edit the block according to the editing instruction and generate a target image by using the edited block, where the block is obtained by dividing the to-be-processed image.

In a second aspect, an embodiment of the present disclosure provides an electronic device, including:

a receiving unit, configured to receive an editing instruction input by a user, where the editing instruction is used for editing a preview image, the preview image is generated by processing a to-be-processed image according to screen resolution of the electronic device, and resolution of the preview image is lower than that of the to-be-processed image;

a processing unit, configured to edit the preview image in response to the editing instruction;

a displaying unit, configured to display the edited preview image;

a storing unit, configured to store the editing instruction;

the receiving unit is further configured to receive a storing instruction input by the user;

the processing unit is further configured to, in response to the storing instruction, load a block of the to-be-processed image corresponding to the editing instruction into a memory to edit the block according to the editing instruction and generate a target image by using the edited block, where the block is obtained by dividing the to-be-processed image.

In a third aspect, an embodiment of the present disclosure provides an electronic device, including: at least one processor and a memory;

the memory stores computer-executable instructions;

the at least one processor executes the computer-executable instructions stored in the memory, so that the at least one processor executes the image editing method as described in the first aspect and various possible designs in the first aspect.

In a fourth aspect, an embodiment of the present disclosure provides a computer-readable storage medium, where the computer readable storage medium stores computer executable instructions, and when a processor executes the computer-executable instructions, the image editing method as described in the first aspect and various possible designs in the first aspect is implemented.

In a fifth aspect, an embodiment of the present disclosure provides a computer program product, including a computer program stored in a readable storage medium, and at least one processor of an electronic device reads the computer program from the readable storage medium, and the at least one processor executes the computer program to cause the electronic device to execute the image editing method as described in the first aspect and various possible designs in the first aspect.

In a sixth aspect, an embodiment of the present disclosure provides a computer program, when being executed by a processor, the computer program is used for implementing the image editing method as described in the first aspect and various possible designs in the first aspect.

The image editing method, device, storage medium, computer program product and computer program provided by the embodiments of the present disclosure, when detecting that the user processes the to-be-processed image with relatively high resolution, the electronic device generates and displays the preview image of the to-be-processed image. In the process of editing the preview image by the user, the electronic device stores editing instructions in turn. When the user saves the edited preview image, the electronic device loads the block corresponding to the editing instruction into the memory according to the stored editing instruction, edits the block according to the editing instruction, and generates the target image according to the edited block. By adopting this solution, when editing the to-be-processed image with relatively high resolution, it is not necessary to load the entire to-be-processed image into the memory at once. Instead, only the block corresponding to the editing instruction is load, so that less data is loaded into the memory, thus overcoming the problem of system collapse caused by insufficient memory or CPU when editing the image with relatively high resolution.

BRIEF DESCRIPTION OF DRAWINGS

In order to illustrate technical solutions in embodiments of the present disclosure or the prior art more clearly, accompanying drawings that need to be used in description of the embodiments or the prior art will be briefly introduced below. It is obvious that the accompanying drawings in the following description are some embodiments of the present disclosure, and for those of ordinary skill in the art, other accompanying drawings may also be acquired according to these accompanying drawings without paying any creative efforts.

FIG. 2 is a flowchart of an image editing method provided by an embodiment of the present disclosure.

DESCRIPTION OF EMBODIMENTS

Figure 1A:
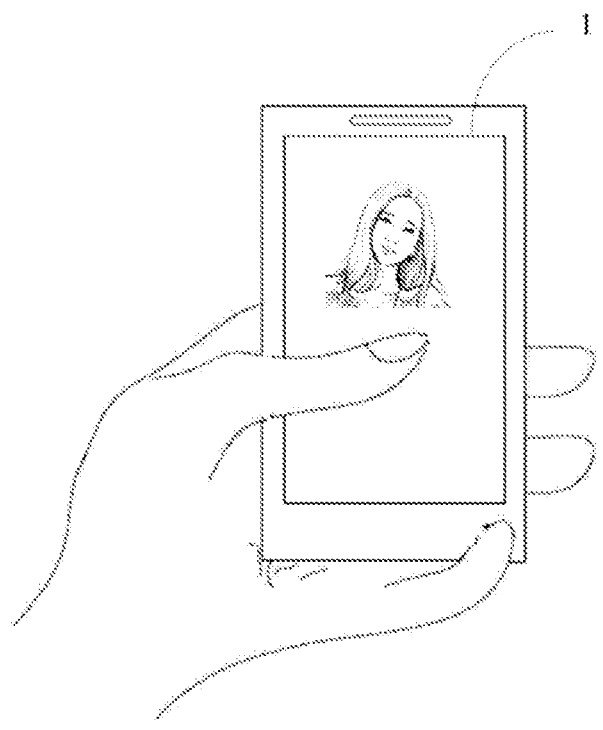
FIG. 1A is a schematic diagram of an operating environment of an image editing method provided by an embodiment of the present disclosure.

In order to make objectives, technical solutions and advantages of the embodiments of the present disclosure clearer, the technical solutions in the embodiments of the present disclosure will be clearly and completely described below with reference to the accompanying drawings in the embodiments of the present disclosure. It is clear that, the described embodiments are some embodiments of the present disclosure, rather than all embodiments. All other embodiments obtained by a person of ordinary skill in the art based on the embodiments of the present disclosure without paying creative efforts shall fall within the protection scope of the present disclosure.

In daily life, when viewing images by using an electronic device such as a mobile phone, a user may often meet some super-large images. The super-large image refers to an image with a very large size or very high resolution, such as an image of 4K, 8K, etc. However, the performance of the memory and the CPU of the electronic device is limited. If the super-large image is fully loaded, it will bring a very large overhead to the memory and the CPU, and even the electronic device will collapse due to insufficient memory. At present, a common way is block loading, that is, only the part visible for the user is encoded and decoded to avoid the image occupying too much memory. This technology has been widely used in electronic maps. For example, when a user navigates using a navigation application (APP), an area on an interface of the navigation APP is an area centered on the user's positioning, rather than the entire map.

With the rapid development of technologies, the user not only uses the electronic device to view the image, but also edits the image through various image editing APPs. In the editing process, the entire image needs to be loaded into the memory. This is because block loading is difficult to meet the requirements of image editing. For example, when a face image needs to undergo beautify processing, it is necessary to extract basic data such as key points of the face. However, the basic data such as the key points of the face is based on the entire image, so it is difficult to perform beautify processing on the image if the image is loaded in blocks. In addition, because the editing of the entire image is relatively simple and easy to operate, even if the image is processed in the local area, the loading is also for the entire image in the prior art.

In the image editing process, if the to-be-edited image is a large image, the image will be loaded into the memory, which will easily lead to excessive memory consumption or insufficient memory. In addition, in the image editing process, because an image processing algorithm and the like need to be executed, some intermediate data will be generated, and the algorithm and the intermediate data will further consume memory, which easily leads to the system collapse of the electronic device and the like.

Obviously, an electronic device with limited memory cannot support the processing of the super-large image. For example, at present, many mobile phones cannot edit ultra-high-definition images such as images of 4K and 8K, etc.

In view of this, embodiments of the present disclosure provide an image editing method and device, in which an editing instruction of a preview image is stored, a to-be-processed image is loaded in blocks according to the editing instruction and the editing is performed on the same, so as to overcome the problem of system collapse caused by insufficient memory or CPU when editing an image with relatively high resolution.

FIG. 1A is a schematic diagram of an operating environment of an image editing method provided by an embodiment of the present disclosure. Referring to FIG. 1A, the operating environment includes an electronic device 1, the electronic device 1 is an electronic device with a display screen, for example. An APP capable of performing image editing is installed on the electronic device 1. A user edits an image with the APP. In the editing process, the user imports the image through an image import button and the like on the APP, so that a preview image of the to-be-processed image is displayed on a display screen of the electronic device. After that, the user inputs an editing instruction, such as selecting a sticker, through the display screen to edit the preview image. The electronic device loads the to-be-processed image in blocks and edits the to-be-processed image according to the editing instruction for the preview image from the user. The to-be-processed image is, for example, an image captured by the electronic device 1; or, the to-be-processed image is an image saved locally by the electronic device 1 by means of copying or the like.

Figure 1B:
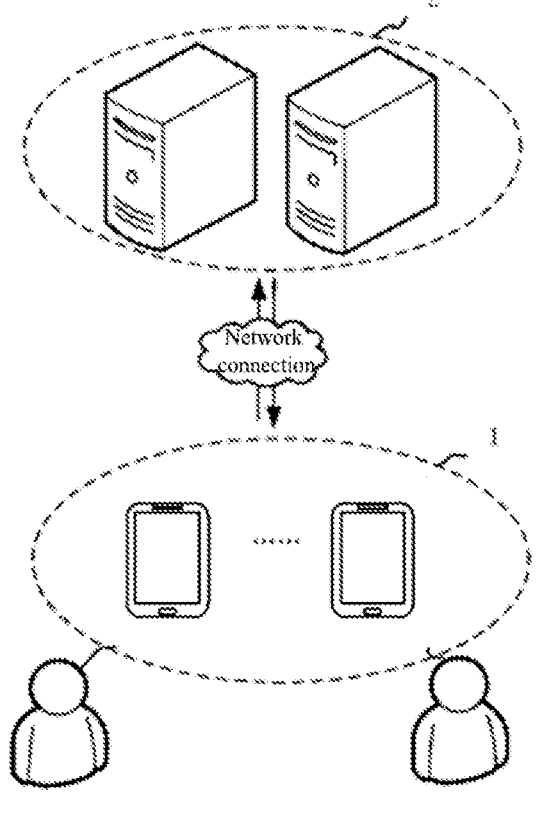
FIG. 1B is a schematic diagram of another operating environment of an image editing method provided by an embodiment of the present disclosure.

FIG. 1B is a schematic diagram of another operating environment of an image editing method provided by an embodiment of the present disclosure. Referring to FIG. 1B, the operating environment includes an electronic device 1 and a server 2, and a network connection is established between the electronic device 1 and the server 2. For example, massive images are saved on the server 2, the electronic device 1 can download an image from the server 1 and edit the image, and reference may be made to the description of FIG. 1A for the editing process, which is not described herein again.

In FIG. 1A and FIG. 1B above, the APP on the electronic device 1 is a system built-in APP, a third-party APP, etc., which is not limited in the embodiment of the present disclosure.

In FIG. 1A and FIG. 1B above, the electronic device 1 is a desktop electronic device or a mobile electronic device, the desktop electronic device is, for example, a television, a computer, etc., and the mobile electronic device is, for example, a mobile phone, a tablet computer, a notebook computer, a wearable electronic device, a smart home device, and the like. The server is an independently set server or a server cluster composed of multiple servers.

It should be noted that, although FIG. 1A and FIG. 1B use the electronic device 1 as the execution body to process the image, the embodiments of the present disclosure are not limited thereto. For example, when the user edits the preview image, the electronic device 1 stores these editing instructions in turn and sends these editing instructions to the server 2 storing the to-be-processed image, and the server 2 loads blocks of the to-be-processed image in turn according to the editing instructions, and performs image processing on the blocks.

FIG. 2 is a flowchart of an image editing method provided by an embodiment of the present disclosure. The execution body of this embodiment is the electronic device in FIG. 1A and FIG. 1B above. This embodiment includes:

101, receive an editing instruction input by a user.

The editing instruction is used for editing a preview image of a to-be-processed image. The preview image is generated by processing the to-be-processed image according to screen resolution of the electronic device, and resolution of the preview image is lower than that of the to-be-processed image.

Exemplarily, the to-be-processed image is a large image, such as a 4K or 8K high-definition image, and the resolution of the image is relatively high, which is higher than the resolution of the screen of the electronic device, resulting in the fact that the electronic device is unable to perform loading or consumes more memory even in a case of successful loading. When the user needs to edit the to-be-processed image, the user clicks the to-be-processed image, the electronic device generates a preview image for the to-be-processed image according to the screen resolution, loads the preview image into the memory, and displays the preview image on the display screen. The resolution of the preview image is less than or equal to the resolution of the screen of the electronic device. Meanwhile, the resolution of the preview image is lower than that of the to-be-processed image, that is, a part of pixels of the to-be-processed image are lost to obtain the preview image. As part of the pixels are lost, if the preview image is amplified, the preview image is blurred when the preview image is amplified to a certain multiple; by contrast, if the to-be-processed image is amplified, the to-be-processed image may not be blurred when it is amplified to the same multiple. Whether blurring would happen depends on a relationship between a screen pixel and an image pixel. For example, when a width of the to-be-processed image is 1080 pixels and the to-be-processed image is displayed on a mobile phone with the width of 720, the to-be-processed image is not blurred when the amplification factor of the to-be-processed image is between 1.0 and 2.0 times. When the magnification exceeds 2 times, the to-be-processed image may be blurred. The preview image of the to-be-processed image is generated according to the screen resolution of the electronic device, and therefore, when the preview image is amplified, the preview image becomes blurred. In the amplification process, the "blur" may be improved in way of local loading, that is, when the amplification operation is performed, the corresponding area is loaded from the to-be-processed image to generate a new preview image.

When editing the preview image, the user selects beautify, makeup, etc. from the interface of the electronic device to input the editing instruction.

In the embodiment of the present application, editing the preview image refers to adjustment on the preview image, such as adjustment of a brightness, contrast, saturation, etc. of the preview image. Alternatively, editing the preview image refers to addition of a filter, appliance of beautify or the like to the preview image.

102, edit the preview image in response to the editing instruction, display the edited preview image, and store the editing instruction.

Exemplarily, every time the user inputs an editing instruction, the electronic device edits the preview image according to the editing instruction and stores the editing instruction at the same time. When there are more than two editing instructions, the object edited via the current editing instruction is a preview image edited via the last editing instruction. That is, each editing is to edit the preview image on the basis of the last editing. After editing, the editing effect is displayed on the display screen of the electronic device in real time for the user to view.

103, receive a storing instruction input by the user.

104, in response to the storing instruction, load a block of the to-be-processed image corresponding to the editing instruction into a memory to edit the block according to the editing instruction and generate a target image by using the edited block, where the block is obtained by dividing the to-be-processed image.

The to-be-processed image includes multiple blocks.

In steps 103 and 104, after editing the preview image, the user clicks the editing instruction on the interface to trigger the electronic device to edit the to-be-processed image (i.e. the original image) according to the stored editing instruction. In the process of editing the original image, the electronic device loads the block corresponding to the editing instruction into the memory, and edits the block according to the editing instruction, finally generates the target image according to the edited block. For example, if the user edits the preview image locally, the block is a local area of the to-be-processed image. For another example, if the user edits the preview image as a whole, the electronic device performs blocking on the entire to-be-processed image, loads one or more blocks corresponding to the editing instruction each time, and edits the block(s). After that, the electronic device generates the target image by using the edited block(s).

The image editing method provided by the embodiment of the present disclosure, when detecting that the user processes the to-be-processed image with relatively high resolution, the electronic device generates and displays the preview image of the to-be-processed image. In the process of editing the preview image by the user, the electronic device stores editing instructions in turn. When the user saves the edited preview image, the electronic device loads the block corresponding to the editing instruction into the memory according to the stored editing instruction, edits the block according to the editing instruction, and generates the target image according to the edited block. By adopting this solution, when editing the to-be-processed image with relatively high resolution, it is not necessary to load the entire to-be-processed image into the memory at once. Instead, only the block corresponding to the editing instruction is load, so that less data is loaded into the memory, thus overcoming the problem of system collapse caused by insufficient memory or CPU when editing the image with relatively high resolution.

In the above embodiment, when generating the target image by using the edited block after editing the block, the electronic device covers a corresponding position of the to-be-processed image with the edited block, thereby obtaining the target image. Alternatively, the electronic device copies the to-be-processed image to obtain a duplicate image, and covers the corresponding position of the duplicate image by using the edited block.

By adopting this solution, the goal of generating the target image by using the edited block is realized.

In the above embodiment, the user performs local editing or global editing on the preview image. In the following, how the electronic device performs local editing and global editing on the to-be-processed image will be explained in detail respectively.

First, the electronic device performs local editing on the preview image. The local editing refers to editing of a local area of the preview image, such as beautify processing on the face area, without editing other areas other than the face area.

Figure 3:
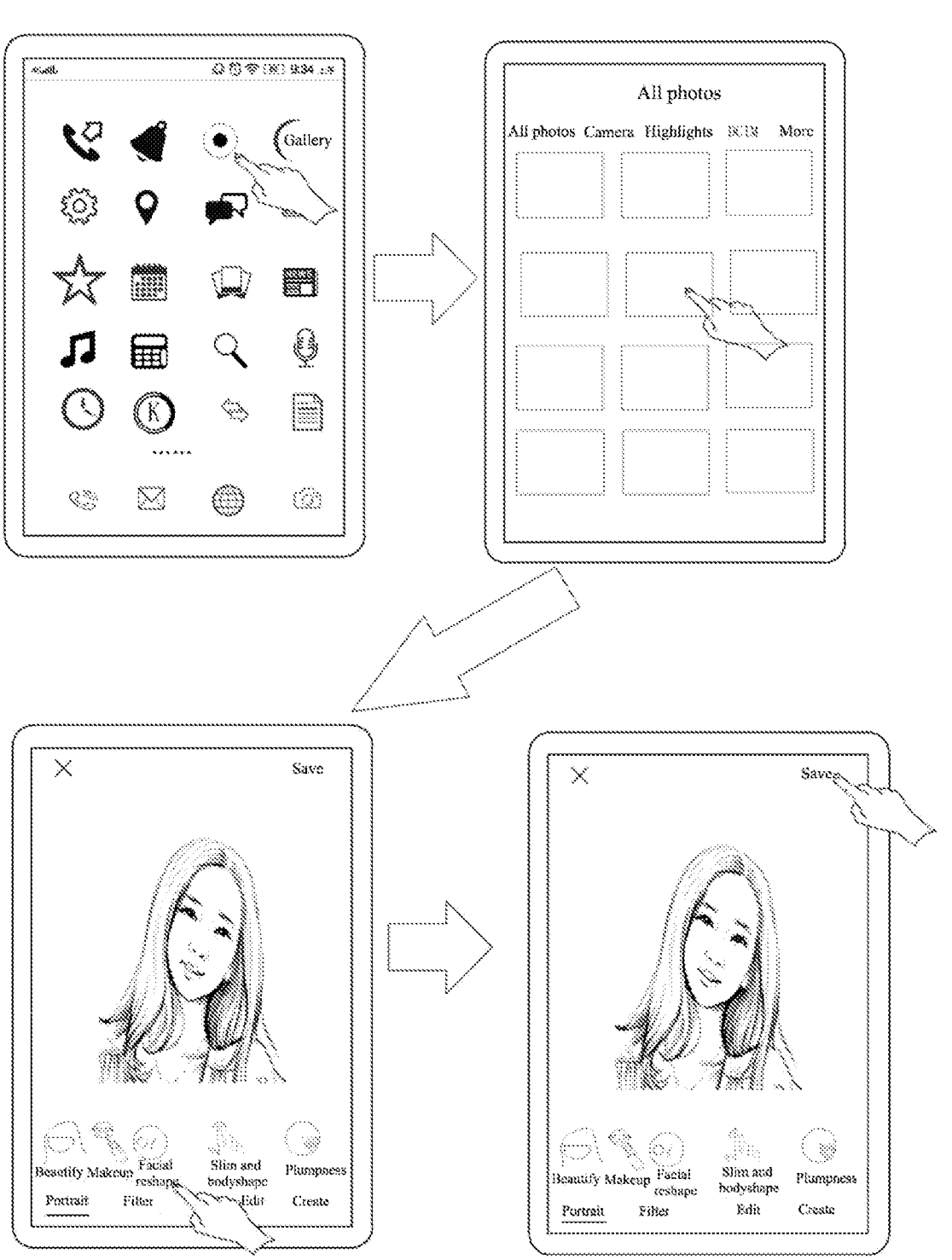
FIG. 3 is a schematic diagram of an image editing process provided by the present disclosure.

FIG. 3 is a schematic diagram of an image editing process provided by the present disclosure. Referring to FIG. 3, the user clicks an icon of the image editing APP on the display screen of the electronic device to enter an image selection interface. The image selection interface displays at least one thumbnail. The user clicks a thumbnail (hereinafter referred to as the target thumbnail) in the at least one thumbnail to send a selecting instruction to the electronic device. In response to the selecting instruction, the electronic device generates a preview image according to the to-be-processed image corresponding to the target thumbnail, and displays the preview image. For example, if the to-be-processed image is a 4K image, then the preview image is a 1K image. The process of generating the preview image by the electronic device is insensitive to the user. Of course, the electronic device can also inform the user by means of a voice prompt, a text prompt, etc. that: the resolution of the to-be-processed image is relatively high, and whether the user agrees to generate the preview image.

For the electronic device, whether the to-be-processed image is a large image is usually related to the performance of the electronic device. For example, for a low-end machine, an image with resolution exceeding 1920×1080 is a super-large image; and for high-end machine, an image with resolution exceeding 4096×2160 is a super-large image. Therefore, when the user selects the target thumbnail, the electronic device generates a preview image only when it is determined that the to-be-processed image is a super-large image.

Exemplarily, when the user selects the target thumbnail, the electronic device reads image information of the to-be-processed image corresponding to the target thumbnail, and then judges, according to the image information, whether a size of the to-be-processed image is greater than a preset threshold; if the resolution of the to-be-processed image is greater than the preset threshold, generates a preview image according to the resolution of the to-be-processed image and the resolution of the electronic device, etc. For example, if the resolution of the display screen of the electronic device is 1920×1080 and the resolution of the to-be-processed image is 4096×2160, a preview image with resolution of 1920×1080 is generated. If the resolution of the to-be-processed image is less than or equal to the preset threshold, the to-be-processed image is directly loaded and edited. If the resolution of the to-be-processed image is greater than the preset threshold, a preview image is generated according to the to-be-processed image. The preset threshold is determined according to at least one of a size of a central processing unit CPU, a size of a graphics processing unit (GPU), a size of the screen resolution and a size of the memory of the electronic device.

By adopting this solution, only when the to-be-processed image is a super-large image, the electronic device generates a preview image for the to-be-processed image and edits it, thus saving steps for image processing.

After the electronic device displays the preview image, various image editing tools are also displayed on the display screen of the electronic device. For example, for a portrait, image editing tools include beautify, makeup, facial reshape, slim and bodyshape, plumpness, etc. In addition, the electronic device also displays other editing tool labels, such as a filter, editing, creation, etc. When the user selects different tool labels, the electronic device displays tools in corresponding categories. The user selects a favorite editing tool to edit the image according to requirements or preferences. The electronic device generates an editing instruction according to the operation of the user on the editing tool to edit the preview image. In the editing process, each editing is to edit the preview image on the basis of the last editing. For example, the user first selects the facial reshape, then the electronic device reshapes the face of the person in the preview image according to the operation of the user, and displays the editing effect in real time. After that, the user selects the plumpness (contours), then the electronic device adjusts the features of the face in the preview image subjected to facial reshape, and displays the editing effect in real time.

After finishing the editing of the preview image, the user clicks a saving button. At this time, the block corresponding to the editing instruction is loaded into the memory for facilitating editing of the block, and the edited block is used for generating the target image, for example, see FIG. 4.

Figure 4:
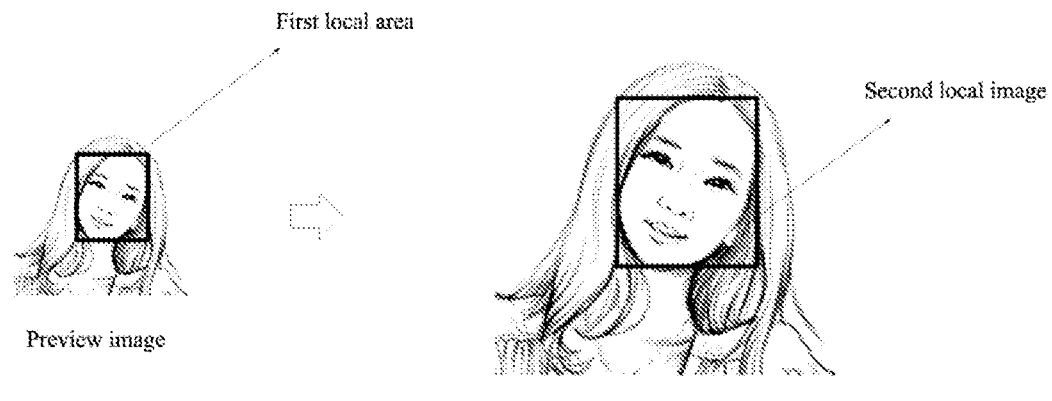
FIG. 4 is a schematic diagram of local editing in an image editing method provided by an embodiment of the present disclosure.

FIG. 4 is a schematic diagram of local editing in an image editing method provided by an embodiment of the present disclosure. Referring to FIG. 4, after the user inputs the storing instruction, the electronic device extracts a block from the to-be-processed image according to a local area of the preview image. Then, the electronic device loads the block into the memory, and edits the block according to the editing instruction to obtain the edited block. Finally, the target image is generated by using the edited block, thereby finishing the editing of the to-be-processed image.

By adopting this solution, when editing the to-be-processed image, only a part of the to-be-processed image, that is, the block, is loaded, so the memory consumption can be reduced.

When the user edits the preview image for many times, that is, when there are at least two editing instructions, the electronic device edits the preview image in turn according to the at least two editing instructions in the process of editing the preview image by the user, displays the edited preview image, and stores the at least two editing instructions in turn according to the input order. After that, when editing the block, the electronic device loads the block into the memory, acquires the editing instructions according to a storing order of the at least two editing instructions stored, and edits the block in turn to obtain the edited block.

Exemplarily, because the to-be-processed image cannot be loaded into the memory, forced loading will lead to memory problems, such as out of memory (OOM). In the embodiment of the present application, all the editing by the user is based on the preview image, and the editing effect that the user sees is also the editing effect of the preview image. When the user finishes saving, the corresponding block in the original image is edited in turn according to the editing order and editing mode of the preview image by the user.

In the editing process, it is necessary to ensure that the editing of the to-be-processed image is consistent with the editing of the preview image. This is because when editing, the editing object of each editing instruction is the editing result of the last editing instruction. In other words, each editing is superimposed on the basis of the editing of the last editing instruction. For example, the editing order of the preview image is: first adjusting the brightness and then adding the filter, then the editing order of the block should also be: first adjusting the brightness and then adding the filter. If the editing order of the preview image is different from the editing order of the block, the superposition effect of editing the block for many times is inconsistent with that of editing the preview image for many times, and even deviation may occur.

In the embodiment of the present application, the electronic device stores multiple editing instructions in turn input by the user according to the input order. After that, when editing the to-be-processed image, the above multiple editing instructions are executed in turn on the block to ensure that the editing process of the to-be-processed image is consistent with the editing process of the preview image, thus achieving the ideal editing effect.

In the above local editing process, there may be a relatively large local area. At this time, if the block in the to-be-processed image is loaded into the memory, it will also lead to the problem of large memory overhead. Therefore, when the size of the block exceeds a preset size, the electronic device needs to divide the block into multiple sub-blocks, where the preset size is, for example, the maximum amount of a single loading of the electronic device. After that, the electronic device loads the multiple sub-blocks into the memory in turn, edits each of the multiple sub-blocks according to the editing instruction to obtain multiple edited sub-blocks, and generates the edited block according to the multiple edited sub-blocks, for example, see FIG. 5.

Figure 5:
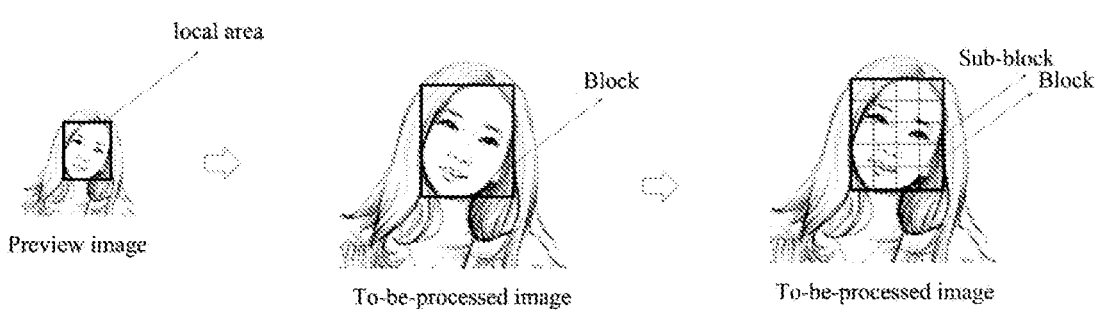
FIG. 5 is a schematic diagram of local editing in an image editing method provided by an embodiment of the present disclosure.

FIG. 5 is a schematic diagram of local editing in an image editing method provided by an embodiment of the present disclosure. Referring to FIG. 5, after the electronic device extracts a block from the to-be-processed image according to the local area of the preview image, if the block is relatively large, the electronic device divides the block into 20 sub-blocks. After that, some sub-blocks are loaded every time, such as loading each of the 20 sub-blocks in turn. For another example, the sub-blocks of a first row, a second row, a third row, a fourth row and a fifth row are loaded in turn according to an order from top to bottom.

By adopting this solution, in the process of local editing, the block is divided into sub-blocks and then the sub-blocks are loaded. Because the size of each of the sub-blocks is smaller than that of the block, the overhead of the memory can be reduced.

The electronic device may flexibly perform blocking on the to-be-processed image in different ways. For example, the electronic device performs blocking on the to-be-processed image according to rows, that is, the continuous rows of pixels are taken as a block; for another example, the electronic device performs blocking on the to-be-processed image according to both rows and columns simultaneously. For another example, the electronic device performs blocking on the to-be-processed image according to areas, for example, assuming that the to-be-processed image contains mountains, water and grassland, the to-be-processed image is divided into three blocks, which are mountains, water and grassland in turn.

Then, the electronic device edits the preview image globally. Global editing refers to editing of the entire preview image. For example, brightness adjustment is performed on the entire preview image.

In the process of global image editing, reference can be made to the description of FIG. 3 above for the process of selecting a target thumbnail by the user and generating a preview image, which is not described herein again.

After finishing the editing of the preview image, the user clicks a saving button. At this time, the electronic device performs blocking on the to-be-processed image to obtain multiple blocks. After that, the electronic device loads some blocks of the multiple blocks into the memory every time, and edits each of the some blocks according to the editing instruction to obtain multiple edited blocks. Finally, the electronic device generates the target image according to the multiple edited blocks, for example, see FIG. 6.

Figure 6:
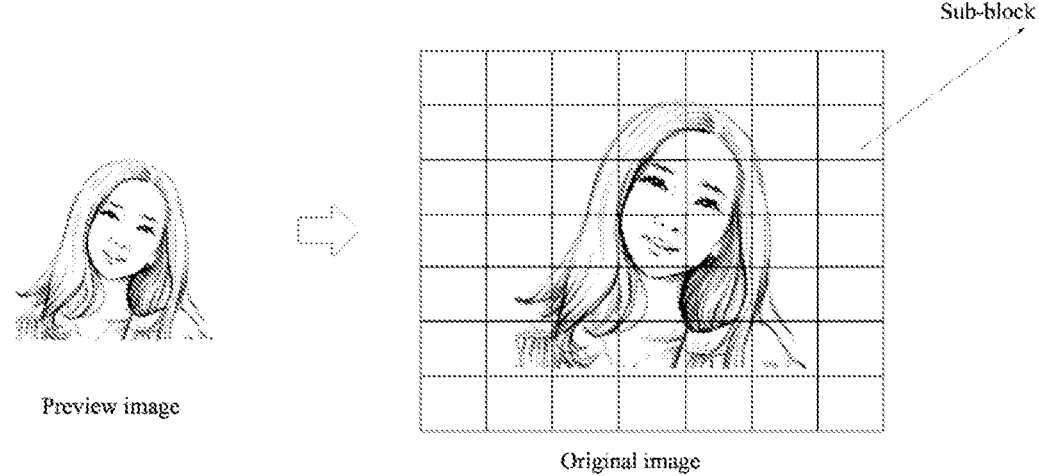
FIG. 6 is a schematic diagram of global editing in an image editing method provided by an embodiment of the present disclosure.

FIG. 6 is a schematic diagram of global editing in an image editing method provided by an embodiment of the present disclosure. Referring to FIG. 6, after the user inputs a storing instruction, the electronic device recognizes that the stored editing instruction is to edit the entire preview image. At this time, the electronic device divides the to-be-processed image into multiple sub-blocks, as shown in the figure, each small square represents a sub-block. After that, the electronic device loads the sub-blocks in turn. For example, one sub-block is loaded each time; for another example, one row or one column of sub-blocks is loaded each time, which is not limited in the embodiment of the present disclosure.

By adopting this solution, when the to-be-processed image is edited globally, only a part of the to-be-processed image (that is, one or more sub-blocks) is loaded, so the memory consumption and the like can be effectively reduced.

In the above embodiment, when performing blocking on the to-be-processed image to obtain the multiple of blocks, the electronic device first finds out a cache that is determined to be used for loading the blocks from the memory, and then divides the to-be-processed image according to a size of the fixed cache to divide the to-be-processed image into multiple blocks, where the fixed cache is used for loading the multiple blocks.

Exemplarily, the electronic device selects, according to the memory size required by the image processing algorithm, a part of memory with an appropriate size from the memory as a fixed cache in the image processing process. At each loading, a fixed number of blocks are loaded, so that the multiple blocks are processed in parallel.

In this way, the fixed cache is used in the image processing process. Because the fixed cache is relatively constant, there will be no abnormal phenomena such as fluctuation, insufficient memory and memory overflow. Therefore, the stability of image processing can be ensured. Moreover, the parallel processing of multiple blocks can improve the image processing speed.

In the above embodiment, when performing blocking on the to-be-processed image according to the size of the fixed cache to divide the to-be-processed image into the multiple blocks, the electronic device first determines a size of a block according to the size of the fixed cache. Then, the electronic device performs grid division on the to-be-processed image according to the size of the block to divide the to-be-processed image into multiple blocks, where two adjacent blocks in the multiple blocks have an overlapping part.

Referring to FIG. 5 and FIG. 6 again, the electronic device divides the block or the to-be-processed image in way of grid division. Taking performing blocking on the to-be-processed image as an example, the electronic device determines which division way to adopt according to the image processing algorithm. For example, when the electronic device applies an image algorithm to a certain area, it simply needs data in that area to perform the image algorithm. At this time, the electronic device adopts a grid division strategy to perform grid division on the to-be-processed image. In a subsequent process of editing the to-be-processed image, the multiple blocks can be processed in parallel, thereby improving the image processing speed. In this scenario, the image processing algorithm is, for example, a sticker, local beautify, etc.

For another example, when the electronic device applies an image algorithm to a certain area, it needs to know not only data of pixels in the area, but also information of surrounding pixels. At this time, the electronic device adopts a sliding window strategy. At this time, two adjacent blocks in the multiple blocks have an overlapping part, for example, see FIG. 7.

Figure 7:
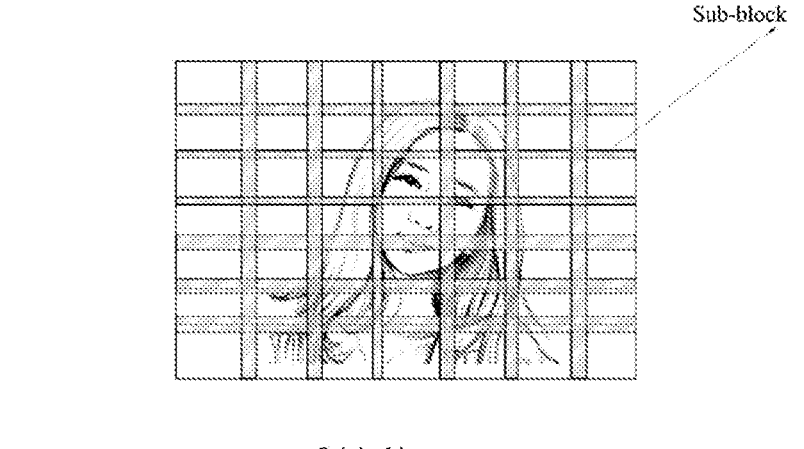
FIG. 7 is a schematic diagram of global editing in an image editing method provided by an embodiment of the present disclosure.

FIG. 7 is a schematic diagram of global editing in an image editing method provided by an embodiment of the present disclosure. Referring to FIG. 7, for every two adjacent sub-blocks, a slash-filled part belongs to both sub-blocks. In this way, when two adjacent blocks are processed, the first block is processed first, and then the second block is processed. When the second block is processed, information of pixels in the first block can be obtained, so that the effect of the processed image is better and the accuracy of image processing is improved. In this scenario, the image processing algorithm is, for example, global beautify, brightness adjustment, contrast adjustment, etc.

By adopting this solution, the to-be-processed image is divided in way of grid division, and the purpose of accurate division of the to-be-processed image is realized.

In the above embodiment, the editing of the preview image by the electronic device according to the editing instruction can be roughly divided into two situations: the editing of pixels and the editing of positions. For example, when adjusting brightness, a pixel and its adjacent pixels need to be adjusted, so there is no need for position mapping. When editing the position, position mapping needs to be performed on a first pixel in the preview image and a second pixel in the block.

In the mapping process, the electronic device first responds to the storing instruction, loads a block of the to-be-processed image corresponding to the editing instruction into the memory, and determines the second pixel from the block according to the first pixel in the preview image, where a position of the second pixel in the to-be-processed image is determined according to a position of the first pixel in the preview image and a scaling ratio, and the scaling ratio is a scaling ratio based on which the preview image is generated from the to-be-processed image. Then, the electronic device edits the second pixel according to the editing of the first pixel through the editing instruction to obtain an edited block, and generates a target image by using the edited block.

For example, if a filter is added to the face in the to-be-processed image, it is necessary to know a position of the face in the to-be-processed image and a position of each part on the face, that is, the face point bitmap. At this time, position mapping needs to be performed. The position mapping refers to: because the effect seen by the user is the editing effect on the preview image, in order to perform the same editing on the to-be-processed image to achieve the same effect, for a position of each edited first pixel in the preview image, a second pixel is found in the to-be-processed image according to a scaling ratio, etc., where the scaling ratio is a scaling ratio which serves as a basis for generating the preview image from the original to-be-processed image.

When the position of the second pixel is determined according to the position of the first pixel, position coordinates of the second pixel can be obtained by multiplying coordinates of the first pixel by the scaling ratio.

By adopting this solution, it is ensured that the editing of the to-be-processed image is consistent with the editing of the preview image, and the purpose of accurate editing of the to-be-processed image is realized.

It should be noted that in the above embodiment, the user directly edits the preview image, and the electronic device displays the editing effect of the preview image. However, the ultimate purpose is to edit the original to-be-processed image. For example, the eyebrow is edited in the preview image, and finally the original to-be-processed image is edited according to the editing of the preview image.

In the above embodiment, after the electronic device generates the target image, the electronic device also deletes the preview image and the stored editing instruction, thereby releasing the storage space of the electronic device.

Figure 8:
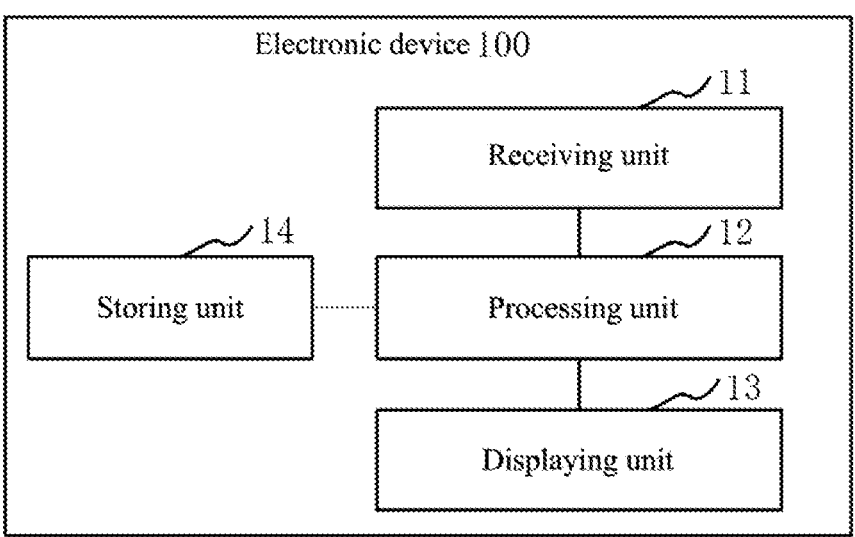
FIG. 8 is a structural block diagram of an electronic device provided by an embodiment of the present disclosure.

Corresponding to the image editing method of the above embodiments, FIG. 8 is a structural block diagram of an electronic device 100 provided by an embodiment of the present disclosure. For ease of description, only a part related to the embodiments of the present disclosure is shown. Referring to FIG. 8, the device includes a receiving unit 11, a processing unit 12, a displaying unit 13, and a storing unit 14.

The receiving unit 11 is configured to receive an editing instruction input by a user, where the editing instruction is used for editing a preview image, the preview image is generated by processing a to-be-processed image according to screen resolution of the electronic device, and resolution of the preview image is lower than that of the to-be-processed image;

the processing unit 12 is configured to edit the preview image in response to the editing instruction;

the displaying unit 13 is configured to display the edited preview image;

the storing unit 14 is configured to store the editing instruction;

the receiving unit 11 is further configured to receive a storing instruction input by the user;

the processing unit 12 is further configured to, in response to the storing instruction, load a block of the to-be-processed image corresponding to the editing instruction into a memory to edit the block according to the editing instruction and generate a target image by using the edited block, where the block is obtained by dividing the to-be-processed image.

In an embodiment of the present disclosure, the editing instruction is used for editing a local area of the preview image, and the processing unit 12 is configured to extract a corresponding block from the to-be-processed image according to the local area of the preview image, load the block into the memory and edit the block according to the editing instruction to obtain an edited block, and generate the target image by using the edited block.

In an embodiment of the present disclosure, the processing unit 12 is configured to divide the block into multiple sub-blocks when a size of the block exceeds a preset size; load the multiple sub-blocks into the memory in turn, edit each of the multiple sub-blocks according to the editing instruction to obtain multiple edited sub-blocks, and generate the edited block according to the multiple edited sub-blocks.

In an embodiment of the present disclosure, the editing instruction is used for editing an entire area of the preview image, and the processing unit 12 is configure to perform blocking on the to-be-processed image to obtain multiple blocks, load some blocks of the multiple blocks into the memory every time and edit each of the some blocks according to the editing instruction to obtain multiple edited blocks, and generate the target image according to the multiple edited blocks.

In an embodiment of the present disclosure, the processing unit 12 is configured to determine a fixed cache from the memory; divide the to-be-processed image according to a size of the fixed cache to divide the to-be-processed image into multiple blocks, where the fixed cache is used for loading the multiple blocks.

In an embodiment of the present disclosure, when the processing unit 12 divides the to-be-processed image according to the size of the fixed cache to divide the to-be-processed image into the multiple blocks, the processing unit 12 is configured to determine a size of a block according to the size of the fixed cache, perform grid division on the to-be-processed image according to the size of the block to divide the to-be-processed image into multiple blocks, where two adjacent blocks in the multiple blocks have an overlapping part.

In an embodiment of the present disclosure, the receiving unit 11 further receives a selecting instruction input by the user before receiving the editing instruction input by the user, where the selecting instruction is used for selecting a target thumbnail from at least one thumbnail, and the target thumbnail is a thumbnail of a to-be-processed image, and the at least one thumbnail is displayed on a display screen of the electronic device;

the processing unit 12 is further configured to generate a preview image of the to-be-processed image in response to the selecting instruction.

In an embodiment of the present disclosure, the processing unit 12 is configured to read image information of the to-be-processed image, and judge, according to the image information, whether the resolution of the to-be-processed image is greater than a preset threshold, the preset threshold being determined according to at least one of a size of a central processing unit CPU, a size of a graphics processing unit GPU, a size of the screen resolution and a size of the memory of the electronic device; and generate the preview image according to the to-be-processed image if the resolution of the to-be-processed image is greater than the preset threshold.

In an embodiment of the present disclosure, there are at least two editing instructions, when the processing unit 12 edits the preview image in response to the editing instruction, the processing unit 12 is configured to edit the preview image in turn according to the at least two editing instructions;

the display unit 13 is configured to display the edited preview image;

the storing unit 14 is configured to store the at least two editing instructions in turn according to an input order;

the processing unit 12 is further configured to load the block into the memory, acquire editing instructions according to a storing order of the at least two editing instructions stored, and edit the block in turn to obtain the edited blocks.

In an embodiment of the present disclosure, when the processing unit 12, in response to the storing instruction, loads the block of the to-be-processed image corresponding to the editing instruction into the memory to edit the block according to the editing instruction, and generates the target image by using the edited block, the processing unit 12 is configured to: in response to the storing instruction, load the block of the to-be-processed image corresponding to the editing instruction into the memory; determine a second pixel from the block according to a first pixel in the preview image, where a position of the second pixel in the to-be-processed image is determined according to a position of the first pixel in the preview image and a scaling ratio, and the scaling ratio is a scaling ratio based on which the preview image is generated from the to-be-processed image; edit the second pixel according to editing of the first pixel through the editing instruction to obtain an edited block; and generate a target image by using the edited block.

In an embodiment of the present disclosure, when the processing unit 12 generates the target image by using the edited block, the processing unit 12 is configured to replace a block at a corresponding position in the to-be-processed image with the edited block to obtain the target image.

The device provided by the embodiment may be used for implementing the technical solution of the above-mentioned method embodiments, for its specific implementation principle and technical effect, reference may be made to the above-mentioned method embodiments, which is not repeated here.

Figure 9:
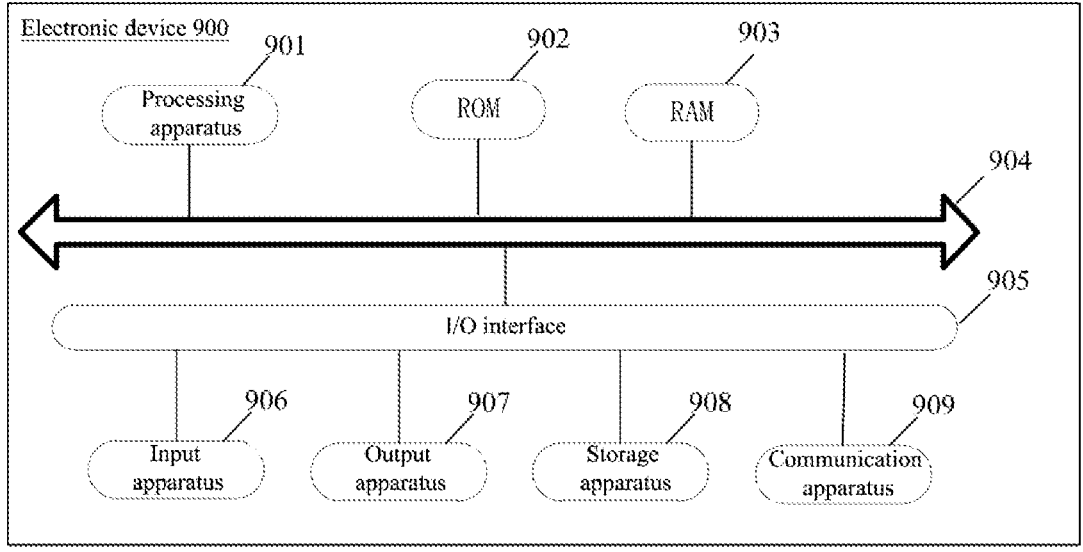
FIG. 9 is a schematic structural diagram of an electronic device provided by an embodiment of the present disclosure.

FIG. 9 is a schematic structural diagram of an electronic device 900 provided by an embodiment of the present disclosure. The electronic device 900 may be a terminal device or a server. The terminal device may include, but is not limited to, a mobile terminal, such as a mobile phone, a notebook computer, a digital broadcast receiver, a personal digital assistant (PDA), a portable android device (PAD), a portable media player (PMP), an in-vehicle terminal (for example, an in-vehicle navigation terminal), a wearable electronic device, and a fixed terminal, such as a digital TV, a desktop computer, a smart home device. The electronic device shown in FIG. 9 is merely an example, and should not bring about any limitation to functions and usage scopes of the embodiments of the present disclosure.

As shown in FIG. 9, the electronic device 900 may include a processing apparatus (for example, a central processor, a graphic processor, etc.) 901, which may perform various appropriate actions and processing according to a program stored in a read only memory (ROM) 902 or a program loaded from a storage apparatus 908 to a random access memory (RAM) 903, so as to implement the method shown in the flowchart of the present disclosure. In the RAM 903, various programs and data required for operations of the electronic device 900 may also be stored. The processing apparatus 901, the ROM 902, and the RAM 903 are connected to each other by a bus 904. An input/output (I/O) interface 905 is also connected to the bus 904.

Generally, the following apparatuses may be connected to the I/O interface 905: an input apparatus 906, which includes, for example, a touch screen, a touch pad, a keyboard, a mouse, a camera, a microphone, an accelerometer, a gyroscope, etc.; an output apparatus 907, which includes, for example, a liquid crystal display (LCD), a speaker, a vibrator, etc.; a storage apparatus 908, which includes, for example, a magnetic tape, a hard disk, etc.; and a communication apparatus 909. The communication apparatus 909 may allow the electronic device 900 to communicate with other devices in a wireless or wired way, to exchange data. Although FIG. 9 shows an electronic device 900 having various apparatuses, it should be understood that it is not required to implement or have all of the shown apparatuses. It is alternatively possible to implement or have more or fewer apparatuses.

In particular, according to an embodiment of the present disclosure, processes described above with reference to the flowcharts may be implemented as a computer software program. For example, an embodiment of the present disclosure includes a computer program product, which includes a computer program carried on a computer readable medium, and the computer program contains program codes used for executing the method shown in the flowcharts. In such embodiment, the computer program may be downloaded and installed from a network via the communication apparatus 909, or installed from the storage apparatus 908, or installed from the ROM 902. When the computer program is executed by the processing apparatus 901, the above functions defined in the method of the embodiments of the present disclosure are performed.

It should be noted that the above computer readable medium in the present disclosure may be a computer readable signal medium, or a computer readable storage medium, or any combination of both. The computer readable storage medium may be, for example, but is not limited to, an electrical, magnetic, optical, electromagnetic, infrared, or semiconductor system, apparatus, or components, or any combination thereof. More specific examples of the computer readable storage medium may include, but is not limited to: an electrical connection with one or more wires, a portable computer disk, a hard disk, a random access memory (RAM), a read only memory (ROM), an erasable programmable read only memory (EPROM or a flash memory), an optical fiber, a portable compact disc read only memory (CD-ROM), an optical storage component, a magnetic storage component, or any suitable combination thereof. In the present disclosure, a computer readable storage medium may be any tangible medium that contains or stores a program, and the program may be used by or in combination with an instruction execution system, apparatus, or component. In the present disclosure, a computer readable signal medium may include a data signal propagated in a baseband or as a part of a carrier, and the data signal carries computer readable program codes. Such propagated data signal may take various forms, including but not limited to an electromagnetic signal, an optical signal, or any suitable combination thereof. The computer readable signal medium may also be any computer readable medium other than the computer readable storage medium, and the computer readable signal medium may send, propagate, or transmit a program which is used by or in combination with the instruction execution system, apparatus, or component. The program codes contained in the computer readable medium may be transmitted by any suitable medium, including but is not limited to: a wire, an optical cable, RF (radio frequency), etc., or any suitable combination thereof.

The above computer readable medium may be included in the above electronic device; or may exist alone without being assembled into the electronic device.

The above computer readable medium carries one or more programs that, when executed by the electronic device, cause the electronic device to perform the method shown in the above embodiments.

The computer program codes used to perform operations of the present disclosure may be written in one or more programming languages or a combination thereof, the above programming languages include object-oriented programming languages, such as Java, Smalltalk, C++, and also include conventional procedural programming languages, such as "C" language or similar programming language. The program codes may be executed entirely on a user's computer, executed partly on a user's computer, executed as an independent software package, executed partly on a user's computer and partly on a remote computer, or executed entirely on a remote computer or a server. In the case of a remote computer involved, the remote computer may be connected to the user's computer through any kind of networks, which includes a local area network (LAN) or a wide area network (WAN), or, the remote computer may be connected to an external computer (for example, be connected to the external computer via the Internet by utilizing an internet service provider).

Flowcharts and block diagrams in the accompanying drawings illustrate architectures, functions, and operations of possible implementations of systems, methods and computer program products according to various embodiments of the present disclosure. In this regard, each block in the flowcharts or block diagrams may represent a module, a program segment, or a part of codes, and the module, the program segment, or the part of codes contains one or more executable instructions used for realizing specified logic functions. It should also be noted that in some alternative implementations, functions marked in the block may also occur in an order different from the order marked in the accompanying drawings. For example, two blocks shown in succession may actually be performed substantially in parallel, and they may sometimes be performed in a reverse order, depending on the functions involved. It should also be noted that each block in the block diagrams and/or the flowcharts as well as combinations of blocks in the block diagrams and/or the flowcharts may be implemented by a dedicated hardware-based system that performs specified functions or operations, or may be implemented by a combination of dedicated hardware and computer instructions.

Units involved in the embodiments described in the present disclosure may be implemented in a software or hardware manner. A name of a unit does not constitute a limitation on the unit itself under certain circumstances, for example, a first acquiring unit may also be described as "a unit for acquiring at least two internet protocol addresses".

The functions herein described above may be performed at least in part by one or more hardware logic assemblies. For example, without limitation, exemplary types of hardware logic assemblies that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine readable medium may be a tangible medium that may contain or store a program to be used by or in combination with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination thereof. More specific examples of the machine readable storage medium would include an electrical connection based on one or more wires, a portable computer disk, a hard disk, a random access memory (RAM), a read only memory (ROM), an erasable programmable read only memory (EPROM or a flash memory), an optical fiber, a portable compact disc read only memory (CD-ROM), an optical storage device, a magnetic storage device, or any suitable combination thereof.

In a first aspect, one or more embodiments of the present disclosure provide an image editing method, including: receiving an editing instruction input by a user, where the editing instruction is used for editing a preview image, the preview image is generated by processing a to-be-processed image according to screen resolution of an electronic device, and resolution of the preview image is lower than that of the to-be-processed image; editing the preview image in response to the editing instruction, displaying the edited preview image, and storing the editing instruction; receiving a storing instruction input by the user; in response to the storing instruction, loading a block of the to-be-processed image corresponding to the editing instruction into a memory to edit the block according to the editing instruction and generate a target image by using the edited block, where the block is obtained by dividing the to-be-processed image.

According to one or more embodiments of the present disclosure, the editing instruction is used for editing a local area of the preview image, and the loading the block corresponding to the editing instruction into the memory to edit the block according to the editing instruction and generate the target image by using the edited block includes: extracting a corresponding block from the to-be-processed image according to the local area of the preview image, loading the block into the memory and editing the block according to the editing instruction to obtain an edited block, and generating the target image by using the edited block.

According to one or more embodiments of the present disclosure, the loading the block into the memory and editing the block according to the editing instruction to obtain the edited block includes: dividing the block into multiple sub-blocks when a size of the block exceeds a preset size; loading the multiple sub-blocks into the memory in turn, and editing each of the multiple sub-blocks according to the editing instruction to obtain multiple edited sub-blocks, generating the edited block according to the multiple edited sub-blocks.

According to one or more embodiments of the present disclosure, the editing instruction is used for editing an entire area of the preview image, the loading the block corresponding to the editing instruction into the memory to edit the block according to the editing instruction and generate the target image by using the edited block includes: performing blocking on the to-be-processed image to obtain multiple blocks, loading some blocks of the multiple blocks into the memory every time, editing each of the some blocks according to the editing instruction to obtain multiple edited blocks, and generating the target image according to the multiple edited blocks.

According to one or more embodiments of the present disclosure, the performing blocking on the to-be-processed image to obtain the multiple blocks includes: determining a fixed cache from the memory, dividing the to-be-processed image according to a size of the fixed cache to divide the to-be-processed image into multiple blocks, where the fixed cache is used for loading the multiple blocks.

According to one or more embodiments of the present disclosure, the dividing the to-be-processed image according to the size of the fixed cache to divide the to-be-processed image into the multiple blocks includes: determining a size of a block according to the size of the fixed cache, performing grid division on the to-be-processed image according to the size of the block to divide the to-be-processed image into multiple blocks, where two adjacent blocks in the multiple blocks have an overlapping part.

According to one or more embodiments of the present disclosure, before receiving the storing instruction input by the user, the method further comprises: receiving a selecting instruction input by the user, where the selecting instruction is used for selecting a target thumbnail from at least one thumbnail, and the target thumbnail is a thumbnail of a to-be-processed image, and the at least one thumbnail is displayed on a display screen of the electronic device; and generating a preview image of the to-be-processed image in response to the selecting instruction.

According to one or more embodiments of the present disclosure, the generating the preview image of the to-be-processed image in response to the selecting instruction includes: reading image information of the to-be-processed image, and judging, according to the image information, whether the resolution of the to-be-processed image is greater than a preset threshold, where the preset threshold is determined according to at least one of a size of a central processing unit CPU, a size of a graphics processing unit GPU, a size of the screen resolution and a size of the memory of the electronic device; generating the preview image according to the to-be-processed image if the resolution of the to-be-processed image is greater than the preset threshold.

According to one or more embodiments of the present disclosure, there are at least two editing instructions, the editing the preview image in response to the editing instruction, displaying the edited preview image, and storing the editing instruction includes: editing the preview image in turn according to the at least two editing instructions, displaying the edited preview image, displaying the edited preview image, and storing the at least two editing instructions in turn according to an input order; the loading the block into the memory and editing the block according to the editing instruction to obtain the edited block includes: loading the block into the memory, acquiring editing instructions according to a storing order of the at least two editing instructions stored, and editing the block in turn to obtain the edited blocks.

According to one or more embodiments of the present disclosure, the in response to the storing instruction, loading the block of the to-be-processed image corresponding to the editing instruction into the memory to edit the block according to the editing instruction and generate the target image by using the edited block includes: in response to the storing instruction, loading the block of the to-be-processed image corresponding to the editing instruction into the memory;

determining a second pixel from the block according to a first pixel in the preview image, where a position of the second pixel in the to-be-processed image is determined according to a position of the first pixel in the preview image and a scaling ratio, and the scaling ratio is a scaling ratio based on which the preview image is generated from the to-be-processed image; editing the second pixel according to editing of the first pixel through the editing instruction to obtain an edited block; and generating a target image by using the edited block.

According to one or more embodiments of the present disclosure, the generating the target image by using the edited block includes: replacing a block at a corresponding position in the to-be-processed image with the edited block to obtain the target image.

In a second aspect, one or more embodiments of the present disclosure provide an electronic device, including:

a receiving unit, configured to receive an editing instruction input by a user, where the editing instruction is used for editing a preview image, the preview image is generated by processing a to-be-processed image according to screen resolution of the electronic device, and resolution of the preview image is lower than that of the to-be-processed image;

a processing unit, configured to edit the preview image in response to the editing instruction;

a displaying unit, configured to display the edited preview image;

a storing unit, configured to store the editing instruction;

the receiving unit is further configured to receive a storing instruction input by the user;

the processing unit is further configured to, in response to the storing instruction, load a block of the to-be-processed image corresponding to the editing instruction into a memory to edit the block according to the editing instruction and generate a target image by using the edited block, where the block is obtained by dividing the to-be-processed image.

According to one or more embodiments of the present disclosure, the editing instruction is used for editing a local area of the preview image, and the processing unit is configured to extract a corresponding block from the to-be-processed image according to the local area of the preview image, load the block into the memory and edit the block according to the editing instruction to obtain an edited block, and generate the target image by using the edited block.

According to one or more embodiments of the present disclosure, the processing unit is configured to divide the block into multiple sub-blocks when a size of the block exceeds a preset size; load the multiple sub-blocks into the memory in turn and edit each of the multiple sub-blocks according to the editing instruction to obtain multiple edited sub-blocks, generate the edited block according to the multiple edited sub-blocks.

According to one or more embodiments of the present disclosure, the editing instruction is used for editing an entire area of the preview image, the processing unit is configure to perform blocking on the to-be-processed image to obtain multiple blocks, load some blocks of the multiple blocks into the memory every time, edit each of the some blocks according to the editing instruction to obtain multiple edited blocks, and generate the target image according to the multiple edited blocks.

According to one or more embodiments of the present disclosure, the processing unit is configured to determine a fixed cache from the memory; divide the to-be-processed image according to a size of the fixed cache to divide the to-be-processed image into multiple blocks, where the fixed cache is used for loading the multiple blocks.

According to one or more embodiments of the present disclosure, when the processing unit divides the to-be-processed image according to the size of the fixed cache to divide the to-be-processed image into the multiple blocks, the processing unit is configured to determine a size of a block according to the size of the fixed cache, perform grid division on the to-be-processed image according to the size of the block to divide the to-be-processed image into multiple blocks, where two adjacent blocks in the multiple blocks have an overlapping part.

According to one or more embodiments of the present disclosure, the receiving unit further receives a selecting instruction input by the user before receiving the editing instruction input by the user, where the selecting instruction is used for selecting a target thumbnail from at least one thumbnail, and the target thumbnail is a thumbnail of a to-be-processed image, and the at least one thumbnail is displayed on a display screen of the electronic device;

the processing unit is further configured to generate a preview image of the to-be-processed image in response to the selecting instruction.

According to one or more embodiments of the present disclosure, the processing unit is configured to read image information of the to-be-processed image, and judge, according to the image information, whether the resolution of the to-be-processed image is greater than a preset threshold, where the preset threshold is determined according to at least one of a size of a central processing unit CPU, a size of a graphics processing unit GPU, a size of the screen resolution and a size of the memory of the electronic device; and generate the preview image according to the to-be-processed image if the resolution of the to-be-processed image is greater than the preset threshold.

According to one or more embodiments of the present disclosure, there are at least two editing instructions, when the processing unit edits the preview image in response to the editing instruction, the processing unit is configured to edit the preview image in turn according to at least two editing instructions;

the display unit is configured to display the edited preview image;

the storing unit is configured to store the at least two editing instructions in turn according to an input order;

the processing unit is further configured to load the block into the memory, acquire editing instructions according to a storing order of the at least two editing instructions stored, and edit the block in turn to obtain the edited blocks.

According to one or more embodiments of the present disclosure, when the processing unit, in response to the storing instruction, loads the block of the to-be-processed image corresponding to the editing instruction into the memory to edit the block according to the editing instruction and generates the target image by using the edited block, the processing unit is configured to: in response to the storing instruction, load the block of the to-be-processed image corresponding to the editing instruction into the memory; determine a second pixel from the block according to a first pixel in the preview image, where a position of the second pixel in the to-be-processed image is determined according to a position of the first pixel in the preview image and a scaling ratio, and the scaling ratio is a scaling ratio based on which the preview image is generated from the to-be-processed image; edit the second pixel according to editing of the first pixel through the editing instruction to obtain an edited block; and generate a target image by using the edited block.

According to one or more embodiments of the present disclosure, when the processing unit generates the target image by using the edited block, the processing unit is configured to replace a block at a corresponding position in the to-be-processed image with the edited block to obtain the target image.

In a third aspect, one or more embodiments of the present disclosure provide an electronic device, including: at least one processor and a memory;

the memory stores computer-executable instructions;

the at least one processor executes the computer-executable instructions stored in the memory, so that the at least one processor executes the image editing method as described above.

In a fourth aspect, one or more embodiments of the present disclosure provide a computer-readable storage medium, where the computer readable storage medium stores computer executable instructions, and when a processor executes the computer-executable instructions, the image editing method as described above is implemented.

In a fifth aspect, one or more embodiments of the present disclosure provide a computer program product, including computer-executable instructions, and when a processor executes the computer-executable instructions, the image editing method as described above is implemented.

In a sixth aspect, one or more embodiments of the present disclosure provide a computer program, when being executed by a processor, the computer program is used for implementing the image editing method as described above.

The above description is merely illustration of preferred embodiments of the present disclosure and applied technical principles. Those skilled in the art should understand that the disclosed scope involved in the present disclosure is not limited to technical solutions formed by a specific combination of the above technical features, and should also cover other technical solutions formed by any combination of the above technical features or equivalent features thereof without departing from the above disclosed concept, for example, a technical solution formed by replacing the above features with technical features having similar functions as the above features and being disclosed in the present disclosure (without limitation).

In addition, although operations are depicted in a specific order, this should not be understood as requiring these operations to be performed in the specific order as shown or in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments may also be implemented in combination in a single embodiment. Conversely, various features described in the context of a single embodiment may also be implemented in multiple embodiments individually or in any suitable subcombination.

Although the present subject matter has been described in language specific to structural features and/or method logical actions, it should be understood that the subject matter defined in the appended claims is not necessarily limited to the specific features or actions described above. Conversely, the specific features and actions described above are merely example forms for implementing the claims.

What is claimed is:

1. An image editing method, comprising:

receiving an editing instruction input by a user, wherein the editing instruction is used for editing a preview image, the preview image is generated by processing a to-be-processed image according to screen resolution of an electronic device, and resolution of the preview image is lower than that of the to-be-processed image;

editing the preview image in response to the editing instruction, displaying the edited preview image, and storing the editing instruction;

receiving a storing instruction input by the user;

in response to the storing instruction, loading a block of the to-be-processed image corresponding to the editing instruction into a memory to edit the block according to the editing instruction and generate a target image by using the edited block, wherein the block is obtained by dividing the to-be-processed image, wherein there are at least two editing instructions, the editing the preview image in response to the editing instruction, displaying the edited preview image, and storing the editing instruction comprises:

editing the preview image in turn according to the at least two editing instructions, displaying the edited preview image, and storing the at least two editing instructions in turn according to an input order, and the loading the block into the memory and editing the block according to the editing instruction to obtain an edited block comprises:

loading the block into the memory, acquiring editing instructions according to a storing order of the at least two editing instructions stored, and editing the block in turn to obtain the edited blocks.

2. The image editing method according to claim 1, wherein the editing instruction is used for editing a local area of the preview image, and the loading the block corresponding to the editing instruction into the memory to edit the block according to the editing instruction and generate the target image by using the edited block comprises:

extracting a corresponding block from the to-be-processed image according to the local area of the preview image;

loading the block into the memory and editing the block according to the editing instruction to obtain an edited block; and generating the target image by using the edited block.

3. The image editing method according to claim 2, wherein the loading the block into the memory and editing the block according to the editing instruction to obtain the edited block comprises:

dividing the block into multiple sub-blocks when a size of the block exceeds a preset size;

loading the multiple sub-blocks into the memory in turn, and editing each of the multiple sub-blocks according to the editing instruction to obtain multiple edited sub-blocks; and generating the edited block according to the multiple edited sub-blocks.

4. The image editing method according to claim 3, wherein before receiving the storing instruction input by the user, the method further comprises:

receiving a selecting instruction input by the user, wherein the selecting instruction is used for selecting a target thumbnail from at least one thumbnail, and the target thumbnail is a thumbnail of a to-be-processed image, and the at least one thumbnail is displayed on a display screen of the electronic device; and generating a preview image of the to-be-processed image in response to the selecting instruction.

5. The image editing method according to claim 2, wherein before receiving the storing instruction input by the user, the method further comprises:

receiving a selecting instruction input by the user, wherein the selecting instruction is used for selecting a target thumbnail from at least one thumbnail, and the target thumbnail is a thumbnail of a to-be-processed image, and the at least one thumbnail is displayed on a display screen of the electronic device; and generating a preview image of the to-be-processed image in response to the selecting instruction.

6. The image editing method according to claim 1, wherein the editing instruction is used for editing an entire area of the preview image, and the loading the block corresponding to the editing instruction into the memory to edit the block according to the editing instruction and generate the target image by using the edited block comprises:

performing blocking on the to-be-processed image to obtain multiple blocks;

loading some blocks of the multiple blocks into the memory every time, and editing each of the some blocks according to the editing instruction to obtain multiple edited blocks;

generating the target image according to the multiple edited blocks.

7. The image editing method according to claim 6, wherein the performing blocking on the to-be-processed image to obtain the multiple blocks comprises:

determining a fixed cache from the memory; and dividing the to-be-processed image according to a size of the fixed cache to divide the to-be-processed image into multiple blocks, wherein the fixed cache is used for loading the multiple blocks.

8. The image editing method according to claim 7, wherein the dividing the to-be-processed image according to the size of the fixed cache to divide the to-be-processed image into the multiple blocks comprises:

determining a size of a block according to the size of the fixed cache; and performing grid division on the to-be-processed image according to the size of the block to divide the to-be-processed image into multiple blocks, wherein two adjacent blocks in the multiple blocks have an overlapping part.

9. The image editing method according to claim 8, wherein before receiving the storing instruction input by the user, the method further comprises:

receiving a selecting instruction input by the user, wherein the selecting instruction is used for selecting a target thumbnail from at least one thumbnail, and the target thumbnail is a thumbnail of a to-be-processed image, and the at least one thumbnail is displayed on a display screen of the electronic device; and generating a preview image of the to-be-processed image in response to the selecting instruction.

10. The image editing method according to claim 7, wherein before receiving the storing instruction input by the user, the method further comprises:

receiving a selecting instruction input by the user, wherein the selecting instruction is used for selecting a target thumbnail from at least one thumbnail, and the target thumbnail is a thumbnail of a to-be-processed image, and the at least one thumbnail is displayed on a display screen of the electronic device; and generating a preview image of the to-be-processed image in response to the selecting instruction.

11. The image editing method according to claim 6, wherein before receiving the storing instruction input by the user, the method further comprises:

receiving a selecting instruction input by the user, wherein the selecting instruction is used for selecting a target thumbnail from at least one thumbnail, and the target thumbnail is a thumbnail of a to-be-processed image, and the at least one thumbnail is displayed on a display screen of the electronic device; and generating a preview image of the to-be-processed image in response to the selecting instruction.

12. The image editing method according to claim 1, wherein before receiving the storing instruction input by the user, the method further comprises:

receiving a selecting instruction input by the user, wherein the selecting instruction is used for selecting a target thumbnail from at least one thumbnail, and the target thumbnail is a thumbnail of a to-be-processed image, and the at least one thumbnail is displayed on a display screen of the electronic device; and generating a preview image of the to-be-processed image in response to the selecting instruction.

13. The image editing method according to claim 12, wherein the generating the preview image of the to-be-processed image in response to the selecting instruction comprises:

reading image information of the to-be-processed image;

judging, according to the image information, whether the resolution of the to-be-processed image is greater than a preset threshold, wherein the preset threshold is determined according to at least one of a size of a central processing unit CPU, a size of a graphics processing unit GPU, a size of the screen resolution and a size of the memory of the electronic device; and generating the preview image according to the to-be-processed image if the resolution of the to-be-processed image is greater than the preset threshold.

14. The image editing method according to claim 1, wherein the in response to the storing instruction, loading the block of the to-be-processed image corresponding to the editing instruction into the memory to edit the block according to the editing instruction and generate the target image by using the edited block comprises:

in response to the storing instruction, loading the block of the to-be-processed image corresponding to the editing instruction into the memory, determining a second pixel from the block according to a first pixel in the preview image, wherein a position of the second pixel in the to-be-processed image is determined according to a position of the first pixel in the preview image and a scaling ratio, and the scaling ratio is a scaling ratio based on which the preview image is generated from the to-be-processed image; and editing the second pixel according to editing of the first pixel through the editing instruction to obtain an edited block, and generating a target image by using the edited block.

15. The image editing method according to claim 1, wherein the generating the target image by using the edited block comprises:

replacing a block at a corresponding position in the to-be-processed image with the edited block to obtain the target image.

16. An electronic device, comprising: at least one processor and a memory;

wherein the memory stores computer executable instructions; and the at least one processor, when executing the computer executable instructions stored in the memory, is caused to:

receive an editing instruction input by a user, wherein the editing instruction is used for editing a preview image, the preview image is generated by processing a to-be-processed image according to screen resolution of the electronic device, and resolution of the preview image is lower than that of the to-be-processed image;

edit the preview image in response to the editing instruction;

display the edited preview image;

store the editing instruction;

receive a storing instruction input by the user;

in response to the storing instruction, load a block of the to-be-processed image corresponding to the editing instruction into a memory to edit the block according to the editing instruction and generate a target image by using the edited block, wherein the block is obtained by dividing the to-be-processed image, wherein there are at least two editing instructions, and the at least one processor is further caused to:

edit the preview image in turn according to the at least two editing instructions, display the edited preview image, and store the at least two editing instructions in turn according to an input order; and load the block into the memory, acquire editing instructions according to a storing order of the at least two editing instructions stored, and edit the block in turn to obtain the edited blocks.

17. A non-transitory computer-readable storage medium, wherein the computer readable storage medium stores computer executable instructions, and when the computer executable instructions are executed by at least one processor, the at least one processor is caused to:

receive an editing instruction input by a user, wherein the editing instruction is used for editing a preview image, the preview image is generated by processing a to-be-processed image according to screen resolution of the electronic device, and resolution of the preview image is lower than that of the to-be-processed image;

edit the preview image in response to the editing instruction;

display the edited preview image;

store the editing instruction;

receive a storing instruction input by the user;

in response to the storing instruction, load a block of the to-be-processed image corresponding to the editing instruction into a memory to edit the block according to the editing instruction and generate a target image by using the edited block, wherein the block is obtained by dividing the to-be-processed image, wherein there are at least two editing instructions, and the at least one processor is further caused to:

edit the preview image in turn according to the at least two editing instructions, display the edited preview image, and store the at least two editing instructions in turn according to an input order; and load the block into the memory, acquire editing instructions according to a storing order of the at least two editing instructions stored, and edit the block in turn to obtain the edited blocks.

\* \* \* \* \*